US010380208B1

(12) United States Patent
Brahmbhatt et al.

(10) Patent No.: US 10,380,208 B1
(45) Date of Patent: Aug. 13, 2019

(54) METHODS AND SYSTEMS FOR PROVIDING CONTEXT-BASED RECOMMENDATIONS

(71) Applicant: Amazon Technologies, Inc., Seattle, WA (US)

(72) Inventors: Kintan Dilipkumar Brahmbhatt, San Francisco, CA (US); Brandon Scott Durham, Seattle, WA (US); Kristine Anne Hanson, Palo Alto, CA (US); Charles Frederick Lee Thorp, Berkeley, CA (US); Rickesh Pal, San Francisco, CA (US); Ted William Thetford, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 636 days.

(21) Appl. No.: 14/981,273

(22) Filed: Dec. 28, 2015

(51) Int. Cl.
| | |
|---|---|
| *G06F 16/9535* | (2019.01) |
| *G10L 17/00* | (2013.01) |
| *G10L 15/20* | (2006.01) |
| *G10L 17/22* | (2013.01) |
| *G10L 15/22* | (2006.01) |

(52) U.S. Cl.
CPC ......... *G06F 16/9535* (2019.01); *G10L 15/20* (2013.01); *G10L 17/005* (2013.01); *G10L 17/22* (2013.01); *G10L 2015/221* (2013.01)

(58) Field of Classification Search
None
See application file for complete search history.

(56) References Cited

U.S. PATENT DOCUMENTS

| | | | |
|---|---|---|---|
| 8,700,102 B2* | 4/2014 | Ferren | G02B 13/0065 455/567 |
| 9,363,155 B1 | 6/2016 | Gravino et al. | |
| 2008/0154870 A1* | 6/2008 | Evermann | G06F 17/30867 |
| 2012/0034904 A1* | 2/2012 | LeBeau | G10L 15/265 455/414.1 |
| 2012/0035924 A1* | 2/2012 | Jitkoff | G01C 21/3608 704/235 |
| 2012/0084277 A1* | 4/2012 | Barve | G06F 17/30864 707/708 |

(Continued)

OTHER PUBLICATIONS

U.S. Appl. No. 14/981,612, filed Dec. 28, 2015, Titled: Methods and Systems for Providing Multi-User Recommendations.

*Primary Examiner* — James Trujillo
*Assistant Examiner* — Cheryl M Shechtman
(74) *Attorney, Agent, or Firm* — Kilpatrick Townsend & Stockton LLP

(57) ABSTRACT

Described herein are online services provided to users based on the current context information of the users. In particular, a user may interact with an interactive device to stream media content from a remote service provider. The user may provide commands to the interactive device using a voice command. The interactive device may transmit requests based on such user command. In order for the service providers to provide customized services, the interactive device can be configured to capture additional contextual data indicative of an environment of the user such as ambient sound and provide such contextual data to the service provider. The service provider can utilize such contextual data to generate content recommendations suitable to the current context of the request or command or user.

20 Claims, 7 Drawing Sheets

(56) References Cited

U.S. PATENT DOCUMENTS

| | | |
|---|---|---|
| 2012/0124456 A1 | 5/2012 | Perez et al. |
| 2013/0326555 A1 | 12/2013 | McMahon |
| 2014/0298364 A1 | 10/2014 | Stepanov et al. |
| 2015/0052115 A1* | 2/2015 | Sharifi ............... G06Q 30/0631 707/722 |
| 2015/0081663 A1* | 3/2015 | Raniere ............. G06F 17/30867 707/708 |
| 2016/0234595 A1* | 8/2016 | Goran .................... H04R 3/002 |
| 2017/0006356 A1* | 1/2017 | Krasadakis ............. G10L 15/18 |
| 2017/0358302 A1* | 12/2017 | Orr ..................... G10L 15/1815 |

\* cited by examiner

METHODS AND SYSTEMS FOR PROVIDING CONTEXT-BASED RECOMMENDATIONS

CROSS-REFERENCE TO RELATED APPLICATIONS

This application incorporates by reference for all purposes the full disclosure of co-pending U.S. patent application Ser. No. 14/981,612, filed Dec. 28, 2018, entitled "METHODS AND SYSTEMS FOR PROVIDING MULTI-USER RECOMMENDATIONS".

BACKGROUND

The advancement in computer technologies especially in computer networks and network-enabled devices allows people to utilize online services to shop, stream music, watch movies, etc., without leaving the comfort of their homes or wherever they are. However, due to the physical distance between the users and the remote online service providers, the service providers typically are not aware of the current environment in which the users are situated. As such, the service/content provided by the remote online service providers is not necessarily suitable or desirably for the current environment. For instance, if a user is in a party and requests music to be streamed, loud party music may be more suitable than softer type of music. On the other hand, quieter type of music may be more suitable if the user is reading a book. The user may explicitly request a particular kind of music based on the current environment, but it would require time and efforts on the user's part for coming up with the right music and thus distract the user from her current task. The problem can be worse when the user is faced with hundreds, thousands, or even millions of choices.

BRIEF DESCRIPTION OF THE DRAWINGS

Various embodiments in accordance with the present disclosure will be described with reference to the drawings, in which.

DETAILED DESCRIPTION

Figure 1:
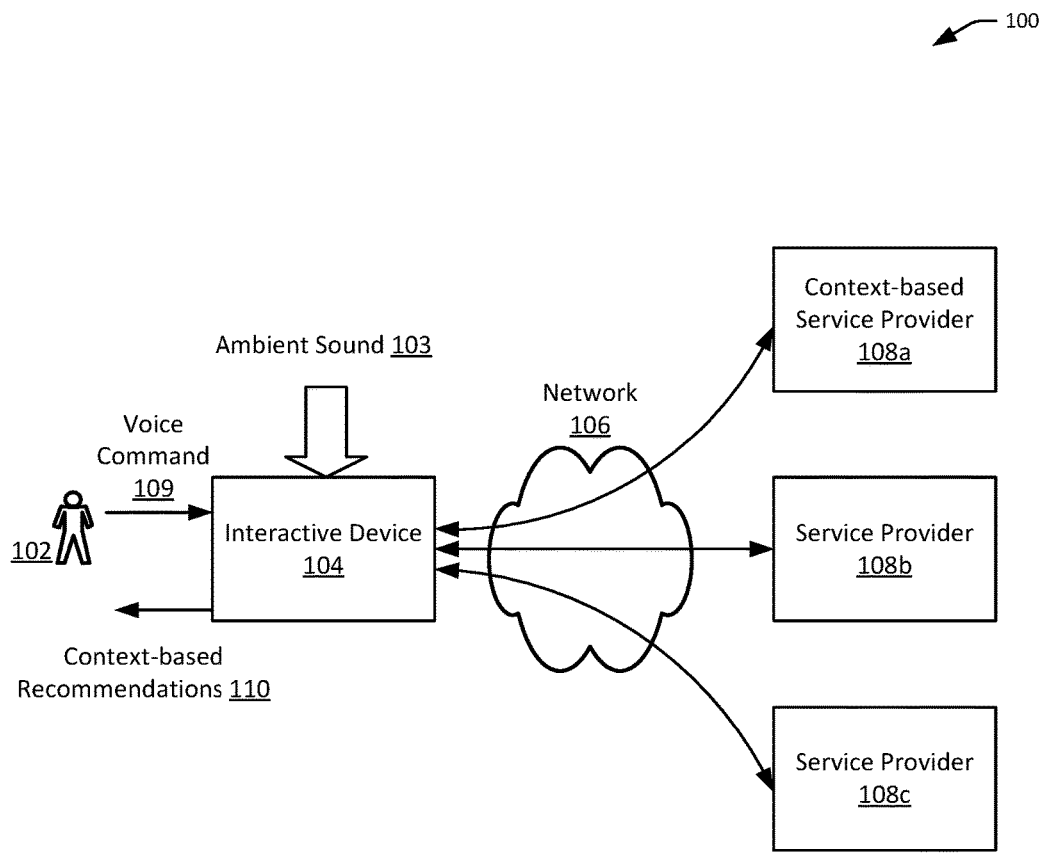
FIG. 1 illustrates an example environment for implementing a context-based recommendation, in accordance with embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide online services to users based on the current context information of the users. In particular, a user may interact with an interactive device to stream media content or utilize other services provided by a remote (e.g., cloud-based) service provider. The user may provide commands to the interactive device using voice command, gestures, touch screens, or any other suitable input method. The interactive device may transmit requests based on such user commands to the service provider, receive corresponding responses from the service provider, and present the responses to the user. In order for the service providers to provide customized services, the interactive device can be configured to capture additional context sensitive information or contextual data indicative of an environment of the user such as ambient sound, location information, images, and the like, and provide such context sensitive information to the service provider. The service provider can utilize such context-sensitive information to customize the response such that the response is suitable to the current context of the request or command or user or user command.

In some embodiments, the interactive device can be a voice-activated device, which streams or playbacks media content in response to voice commands from a user. The interactive device may be configured to capture a voice command from users (e.g., "play music") and ambient sound indicative of an environment in which the interactive device is situated. In some embodiments, the voice command is the primary sound being monitored by the interactive device and the ambient sound includes any background noise associated with the voice command that is not the primary sound. The ambient sound may also include any sound before or after the occurrence of the voice command. The interactive device may generate a request for media content based on the voice command and/or the ambient sound and transmit the request to a service provider computer. In some cases, the interactive device may be capable of recognizing different types of voice command (e.g., "play music", "play radio", "what is the weather like?" etc.) and generate different requests accordingly (e.g., retrieving music, streaming radio, getting weather update, etc.). In some other cases, the interactive device may defer the task of voice recognition to the service provider computer and pass on captured audio signals to the service provider.

An environment includes surroundings or conditions in which one or more people, animals, plants, or other objects are located. The environment can include naturally occurring elements (e.g., weather, climate, natural resources, animals, plants, natural landscape, etc.) and/or man-made elements (e.g., noise, pollution, people, buildings, vehicles, machineries, consumer products, appliances, etc.). At any given time, an object can be surrounded by more than one environment with different scopes defined by the distance from the object. For example, a person can be inside a room environment within a few feet of the user, which is inside a building environment within a few hundred feet, which is within a city environment defined by the city limit, which is inside a state environment defined by the state boundary, and so on. An environment of an interactive device, as discussed herein, typically includes those surroundings (e.g., people, objects) and conditions that are within a detectable distance from the interactive device. At any given time, the detectable distance may be determined by the limits and configurations of environment sensors that are active at the given time. For example, a microphone array of the interactive device is capable of detecting audible sound from as far as 15 feet away. A proximity sensor of the interactive device is capable of detecting objects from as far as 20 feet. And interactive device is capable of detecting Bluetooth® signals from as far as 30 feet. Then, the detectable distance may be 15 feet when only the microphone array is active, 20 feet when both the microphone array and the proximity sensor are active, and 30 feet when Bluetooth is also enabled.

The interactive device may receive recommendations about media content and playback or stream the recommended media content. In some cases, the interactive device may receive the recommended media content. In other cases, the interactive device may receive instructions for obtaining the recommended media content, such as pointers or connection information for other resources or services. In these latter cases, the interactive device may obtain the recommended media content from these other resources or services.

The service provider computer can be configured to receive a request for media content from the interactive device, generate recommendations based at least in part on an ambient sound indicative of an environment of the interactive device, and provide the recommendations to the device. In some instances, the request from the interactive device may invoke a natural language voice interface provided by the service provider. In some other cases, the request from the interactive device may invoke a non-natural language voice interface.

The service provider may analyze the voice command included in the request in order to determine the intent of the user. For example, the service provider may determine the type of service that the user wishes to receive (e.g., music streaming, traffic update), the type of media content (e.g., music, radio, podcast), the duration of the media content, the type music (e.g., jazz, classical), and other information related to the service that the user wishes to utilize.

Additionally, the service provider may obtain the ambient sound indicating a context of the request or command or command. The context may be determined by comparing audio features from the ambient sound with known or previous audio features associated with known contexts. The context may indicate a time, location, or event at which the voice command was issued. The context may also indicate an activity that the user is engaged in. For example, loud noises from music and people can indicate a party or gathering. Road noises from vehicles may indicate that the user is on the street at certain time of the day. Noises from home appliances can indicate that the user is at home cooking. Noises associated with workout equipment can indicate that the user is working out. And so on. In some embodiments, different profiles or fingerprints may be associated with different contexts. Each profile may comprise a set of known or predetermined features, which may be matched against features extracted from the ambient sound and/or other sources. If there is a match, then it is likely that the ambient sound is obtained from a context similar to the context associated with the profile; and vice versa.

In some embodiments, a confidence level about the context that is determined based on the ambient sound may be optionally increased or lowered based on other contextual data such as time information, location information, device information, and other sensing data (e.g., images, proximity data) obtained from the interactive device or some other sources. For example, if the ambient sound fits the profile of a "party" context but the location of the interactive device is at a hospital, then the confidence level of the "party" context may be lowered. As another example, if the ambient sound fits the profile of a "home TV night" context and the timestamp associated with the request is a weekend evening, then the confidence level of the "home TV night" context may increase. As yet another example, aspects of the specific device from which the request is sent may affect the context determination. For example, if the ambient sound fits the profile of a "family gathering" context and the interactive device is a smart TV, then the confidence level of the "family gathering" context may increase. In contrast, the confidence level of the profile of a "on the street" context may decrease for a smart TV.

Once a context is determined based on the ambient sound (and optionally other contextual data), the context may be used by the service provider computer to generate a response to the request. The response may include, for example, recommended media content (e.g., music) to be streamed to the interactive device. The service provider computer may select the media content based at least in part on the context. For example, loud and lively music may be selected for a party context, softer and quieter music may be selected for a home dinner context, classic rocks may be selected for an adult gathering, children's music may be selected for a kid's birthday party, classical music may be selected for a wedding ceremony, and so on.

In some embodiments, the recommendations can be generated based both on the voice command and the ambient sound. For instance, the voice command can be used to identify a user account and the ambient sound can be used to select music from a playlist associated with the user account that fits a particular context. As another example, the voice command may indicate that the user wants to hear music from a particular artist and the ambient sound may be used to select particular music from that particular artist that fits the context for the ambient sound. In some cases, other contextual data such as time, location, device information, and other sensing data (e.g., visual data, temperature, etc.) can also be useful in generating the recommendations.

The generated recommendations may be associated with a given context for the particular user and/or device, so that similar recommendations can be returned for subsequent requests associated with the same or a similar context.

Consider the following example use case. Alice uses her voice to interact with her voice-activated interactive device to obtain media content from a cloud-based music streaming service. For example, she may say "play music" to the interactive device to hear music streamed from the music service to the interactive device. However, some music may be more suitable than others given her current environment. For example, if she is in a party setting, then loud party music may be more desirable. If she is alone reading a book, then quiet music may be more suitable.

To provide music customized to her particular context, the interactive device can be configured to capture the ambient noise around the time Alice says "play music" and provide the ambient sound to a service provider. The service provider may analyze the ambient noise to identify certain audio features from the ambient noise indicating a context of the voice command. For example, the ambient noise may include loud noises from people and music. Such audio features may indicate a party context. Based on this context, music suitable for a party setting may be retrieved and streamed to the interactive device. As another example, the ambient noise may include the crying of a baby. Such an audio feature may indicate a quiet setting evening setting where a baby needs to be soothed. Based on this context, soft lullabies may be retrieved and streamed to the interactive device.

The context-based recommendation service described herein provide an improved user experience for users. The natural language voice interface allows users to interact with the services in a most intuitive and natural manner. Additionally, instead of pausing to think of the types of media content to stream for different situations, a user can simply say "play music" to receive recommendations generated automatically based on her current context with minimal user intervention, hence saving the user time and efforts for coming up with the right music. Furthermore, in some instances, the recommendations may be better or more appropriate for a given context than what the user would have chosen, given the large amount of media content that the recommendation service can choose from.

Various embodiments will now be discussed in greater detail with reference to the accompanying figures, beginning with FIG. 1.

FIG. 1 illustrates an example environment 100 for implementing context-based recommendation, in accordance with embodiments. As illustrated, a user 102 can interact with an interactive device 104 using voice command 109 or other user command in order to utilize services provided by one or more service provider computers 108*a-c* over a network 106, including a content-based service provider 108*a*. The interactive device 104 can be configured to also capture the ambient sound 103 or other contextual data indicative of a context of the user 102. The user command 109 and the contextual data 103 may be provided to the context-based service provider 108*a*, which may provide recommendations 110 suitable for the context of the user.

While the following discussion uses a streaming service for media content (e.g., audio or video content) as an example, it is understood that any suitable service may be provided using the techniques described herein. Examples of the services can include the retrieval or streaming of music, radio, video, weather forecast, traffic condition, or other content. Other services may also allow users to perform real-time or nearly real-time communication with other users over the network such as participating in audio or video calls. Additional examples of the services can include shopping, personal finance management (e.g., banking or investment), travel arrangement, gaming, and the like.

In various embodiments, the interactive device 104 can be configured to receive a user's voice command 109 or other user command provided via gestures, touch, remote controller, mobile device (smart phone), mouse, stylus, keyboard, keypad, touchscreen, or any other suitable means. In an embodiment, the user input may be processed by the interactive device 104 to generate one or more requests or messages to the suitable service providers. For instance, the interactive device may process a voice command from a user to determine what type of service is being requested and which service provider to contact. For instance, if the user command is a voice command, a voice-based service interface may be invoked. If the user command is a text-based command, a text-based service interface may be invoked. If the user command is "play music," a music streaming service may be invoked. If the user command is to obtain the current traffic update, a traffic service may be invoked. And so on. In another embodiment, the interactive device may provide the user input directly to a service provider which then processes the user input. For instance, a voice command may be provided to a service with a voice-based interface and voice recognition capabilities. An image of a gesture may be provided to a service with an image-based interface and image processing capabilities. And so on.

The interactive device may be also be configured to detect ambient sound 103 or other contextual data associated with the user input. Generally, contextual data can indicate an environment in which the user and/or the interactive device are located. Examples of contextual data can include time or location of the user and/or interactive device, ambient sound, light, smell, movement, proximity to surrounding objects, and the like. For example, the ambient sound can include voices of people or pets near the interactive device, sound from electronics and appliances (e.g., phone rings, radio, TV, microwave, dishwasher, washer/dryer, air conditioning or heater), sound from vehicles (e.g., cars, planes, ships) or machineries, sound from nature (e.g., wind, rain, thunder, trees, animals), and the like. The ambient sound can indicate a time, location, event, user activity, proximity of people or pets, and the like. For example, the sound of evening news on TV can indicate a time in the evening, the sound of home appliances can indicate a home setting, the sound of people singing the "Happy Birthday" song can indicate a birthday party, the sound of multiple distinct voices can indicate the presence of multiple people nearby, the sound of a dog barking or a cat meowing can indicate pets nearby, and so on.

In some cases, contextual data can include information about the interactive device such as a device identifier, an operating state, a spatial disposition, a movement, and/or any other suitable aspects of the interactive device. In some other cases, contextual data can include information about other objects in the surrounding environment of the interactive device. In various embodiments, such contextual data can be captured by suitable sensors that may be part of or operably connected to the interactive device.

The interactive device can be configured to collect such contextual data in any suitable manner. For example, the contextual data can be captured in response to certain triggering event such as before, during, and/or after the detection of a predetermined user input (e.g., a phrase or gesture). In other examples, contextual data can also be captured on an ongoing or periodic basis (e.g., every two seconds). The types and/or the amount of contextual data collected may also vary depending on the state of the device, time of day, external events, user actions, and other factors.

Some or all of the contextual data collected by the interactive device and/or other devices may be provided to a context-based service provider 108*a* via a network 106. In some cases, the contextual data may be provided along with the user command (e.g., voice command). For instance, a voice command and its background ambient sound may be provided as a single audio recording to the service provider. In some other cases, the contextual data and the command data may be provide separately in separate parts of the same message or in separate messages. In some cases, the contextual data and/or the command data may be preliminarily processed by the interactive device to determine the suitable service provider and/or the suitable interface to be invoked.

The context-based service provider 108*a* may be configured to analyze of the contextual data provided by the interactive device to determine a context in which the interactive device is situated. For instance, if the contextual data includes ambient sound, the ambient sound may be processed to identify audio features that can be compared with predetermined audio features of known or previously stored ambient profiles, each associated with one or more contexts. The profile or profiles that most closely match the ambient sound may be determined and the context(s) associated with the profile(s) retrieved. In some embodiments, a confidence level or weight value indicating a likelihood of a match may be assigned to a profile and/or a context based on various factors and/or rules and the context(s) with the highest confidence level(s) may be selected.

Recommendations with respect to services to be provided to the user may then be generated based on the determined context(s). For example, recommendations of loud music may be provided for a party context whereas softer music may be provided for a quieter context such self-study.

In some embodiments, user attributes can be used to generate recommendations including personal information (e.g., age, occupation, race, ethnicity, nationality, religion, language), preferences (e.g., favorite types of music or artists, preference indicators such as "like" or "dislike" provided by the user), patterns of user or group behaviors (e.g., frequent streaming or playback of a particular song or songs by a particular artist), and the like. In some embodiments, the recommendations can also be generated based on information about the device. Such information can include historical data associated with users of the device such as user interaction data (e.g., browsing history), requests/responses with service providers, playlists, libraries, behavioral data of users of the device (e.g., playback or streaming habits), and the like.

In some embodiments, the context-based service provider 108a may itself utilize services provided by the other service providers 108b, 108c in order to provide a service to the user. For example, a context-based music streaming service provider 108a may rely on a voice recognition service 108b to analyze audio data received from the user and may obtain music from another music service provider 108c.

In some embodiments, the context-based service provider 108a may provide requested data directly to the interactive device, For instance, a context-based music streaming service may stream music directly to the interactive device. In some other embodiments, the context-based service provider 108a may provide instructions on how to obtain the requested data from other service providers 108b, 108c to the interactive device. Such instructions may include a resource identifier (e.g., a Uniform Resource Identifier (URI)) of a web service and/or parameters thereof, connection information to a data store, credentials to access a resource, and the like. The interactive device may then obtain the requested data from such other service providers using such instructions. In either case, the interactive device 104 can be configured to output the content-based recommendations 110 via a speaker, a display, a tactile device, or the like. For instance, the interactive device 104 may stream music or other media content recommended by the context-based service provider 108a.

Figure 2:
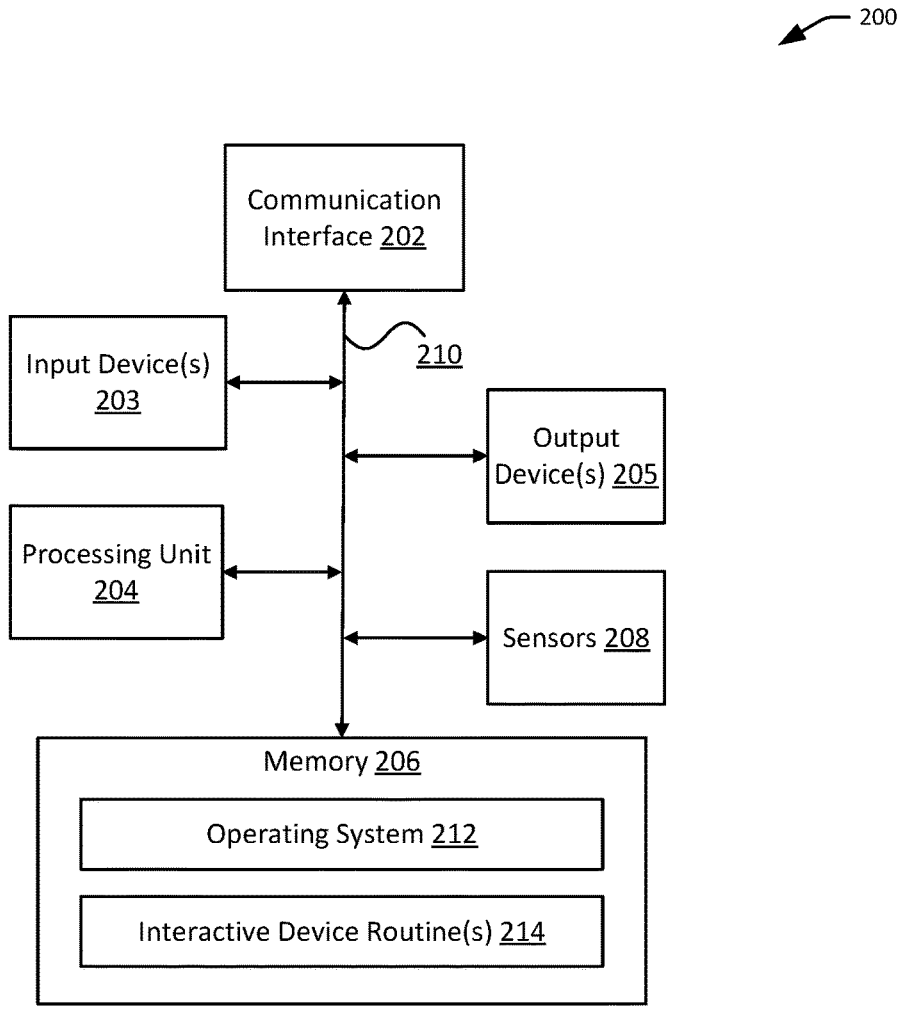
FIG. 2 illustrates example components of an interactive device for implementing aspects of the present invention, in accordance with embodiments.

FIG. 2 illustrates example components of an interactive device 200 for implementing aspects of the present invention, in accordance with embodiments. In an embodiment, the interactive device 200 may be configured to implement interactive device 104 of FIG. 1. In some embodiments, interactive device 200 may include many more components than those shown in FIG. 2. However, it is not necessary that all of these generally conventional components be shown in order to disclose an illustrative embodiment.

As shown in FIG. 2, the interactive device 200 may be any type of computing device such as, but not limited to, a voice-activated media player, a smart TV, a game console, a set-top box, a mobile phone, a smart phone, a personal digital assistant (PDA), a laptop computer, a desktop computer, a server computer, a thin-client device, a tablet PC, etc. Additionally, interactive devices 200 may be any type of wearable technology device, such as a watch, earpiece, glasses, etc.

In an embodiment, interactive device 200 includes one or more input devices 203, one or more output devices 205, one or more optional sensors 208, one or more processing units 204, a memory 206, all interconnected along with the communication interface 202 via a bus 210.

The interactive device 200 can include a communication interface 202 configured to transmit and/or receive data from one or more external devices (e.g., a terminal, display device, or other remote controller). In particular, the communication interface 202 may be configured to communicate with a service provider computer such as discussed in FIG. 3, a user device operated by a user, another interactive device, or any other suitable objects. Any suitable means of communication can be used, such as wired communication or wireless communication. For example, the communication interface 202 can utilize one or more of local area networks (LAN), wide area networks (WAN), infrared, radio, WiFi, point-to-point (P2P) networks, telecommunication networks, cloud communication, short range communication network (e.g., Bluetooth or Near Field Communication (NFC)), and the like. Optionally, relay stations, such as towers, satellites, or mobile stations, can be used. Wireless communications can be proximity dependent or proximity independent.

The interactive device 200 can also include one or more input devices 203 for receiving user input. Examples of input devices can include microphones or microphone arrays, camera, remote controller, mouse, stylus, keyboard, keypad, touchscreen, biometric scanner, or any other suitable means. In some embodiments, the user input devices 203 can be used to collect a user's biometric information such as retina scan, fingerprint, facial recognition, blood pressure, heart rate, glucose level, and the like.

The interactive device 200 can optionally include one or more sensors 208 for sensing contextual data. Examples of such sensors 208 can include auditory sensors (e.g., microphone, noise filters, and other sensors for capturing sound), position sensors (e.g., GPS sensor and magnetometer), temperature sensors (e.g., mechanical or electrical temperature sensor), pressure sensors (e.g., barometer), chemical sensors (e.g., breathalyzers and carbon monoxide sensor), motion sensors (e.g., accelerometers), rotation sensors (e.g., gyroscope), proximity sensors (e.g., ultrasound sensors, Lidar sensors, or infrared sensors), light sensors (e.g., visible light camera, infrared camera, RGB camera, depth aware camera, infrared laser projector, ultraviolet sensitive cameras, scanning sensor, light filters and any combination of the foregoing), smell sensors, and the like. In some embodiments, some or all of the sensors may be an integral part of the interactive device 200. For instance, some of the sensors may be contained within or attached to a housing of the interactive device 200. Some or all of the sensors can be the input devices 203 discussed above. Additionally or alternatively, some or all of the sensors may be operably connected to the interactive device instead of being a part of the interactive device 200. For instance, some of the sensors (e.g., temperature sensor, light sensor) may be configured to communicate wirelessly with the interactive device 200. Motion sensors embedded within the interactive device and/or remotely connected to the interactive device may be configured to detect motion of the interactive device itself and/or motion of objects surrounding the interactive device.

In some embodiments, the user input devices 203 (e.g., microphone) can be used to capture contextual data (e.g., ambient sound).

The interactive device 200 may also include one or more output devices 205 for providing output. Examples of output devices 205 can include a speaker, a display, a printer, a sensation generator for generating a tactile sensation, a smell, and the like.

The processing unit(s) 204 may be capable of executing one or more methods or routines stored in the memory 206. The processing unit 204 can have one or more processors, such as a programmable processor (e.g., a central processing unit (CPU)). For example, the processing unit 204 may include a field programmable gate array (FPGA) and/or one or more ARM processors. The processor(s) may be implemented as appropriate in hardware, computer-executable instructions, firmware or combinations thereof. Computer-executable instruction or firmware implementations of the processor(s) may include computer-executable or machine executable instructions written in any suitable programming language to perform the various functions described.

The memory 206 can include non-transitory computer readable medium for storing logic, code, and/or program instructions executable by the processing unit 204 for performing any suitable embodiment of the methods described herein. The memory 206 can include an operating system 212 and one or more interactive device routines 214. The one or more modules 214, when executed by the processing unit 204, may provide various functionalities associated with the context-based recommendation service as described herein.

For example, the processing unit 204 can be configured to execute instructions causing one or more processors of the processing unit 204 to receive user input and/or contextual data from the input devices 203, sensors 208, and/or communication interface 202. The processing unit 204 can also be configured to execute instructions causing one or more processors of the processing unit 204 to provide some or all of the received data to a remote device (e.g., a service provider computer), receive response data from the remote device, and output some of all of the response data via the output devices 205. The processing unit 204 can also be configured to execute instructions causing one or more processors of the processing unit 204 to process the received data to implement voice recognition, signal processing, context determination, and other techniques discussed herein. The memory 206 can store any data received from the input device 203, sensors 208, and/or communication interface 202, as well as data produced by the processing unit 204.

In some embodiments, the interactive device 200 also communicates via bus 210 with one or more local or remote databases or data stores such as an online data storage system via the bus 210 or the communication interface 202. The bus 210 may comprise a storage area network ("SAN"), a high-speed serial bus, and/or via other suitable communication technology. In some embodiments, such databases or data stores may be integrated as part of the interactive device 200.

Figure 3:
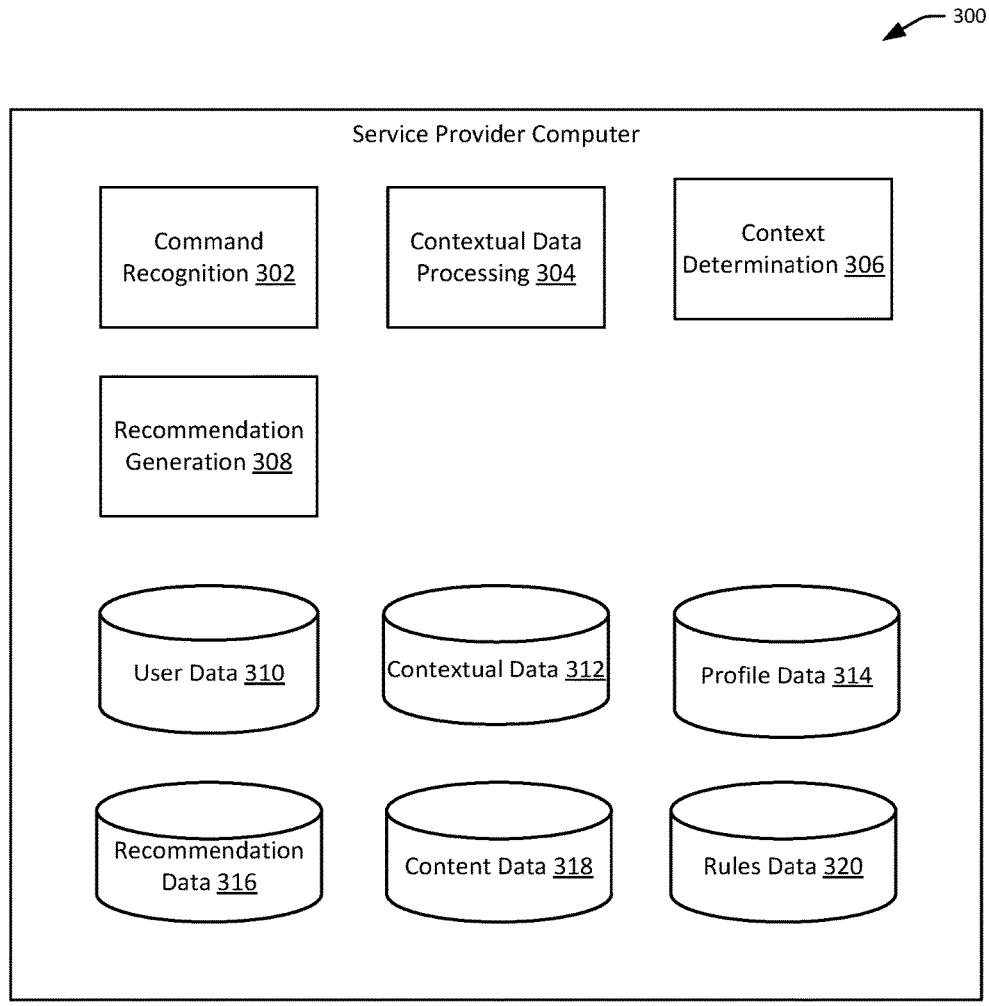
FIG. 3 illustrates components of an example service provider computer configured to provide context-based recommendations, in accordance with embodiments.

FIG. 3 illustrates components of an example service provider computer 300 configured to provide context-based recommendations, in accordance with embodiments. In an embodiment, the service provider computer can be configured to obtain contextual data from a device such as discussed in FIGS. 1 and 2, process the contextual data to determine a context, and generate recommendations for content to be provided to the device based on the context. As illustrated, the service provider computer 300 can comprise a command recognition module 302, a contextual data processing module 304, a context determination module 306, and a recommendation generation module 308. The service provider computer 300 can further comprise or operatively coupled to a plurality of data stores including a user data store 310, a contextual data store 312, a profile store 314, a recommendation data store 316, a content data store 318, and a rules data store 320. The service provider computer 300 can further comprise a processor (not shown) and a computer-readable medium (not shown) coupled to the processor, the computer-readable medium comprising code, executable by the processor, for implementing the modules and methods described herein.

The command recognition module 302 can be configured to recognize a user command. The command recognition module 302 can include a voice recognition module capable of identifying a user's voice from audio data and/or determining a command or request based on the identified voice. The audio data may be stored in user data store 310. For instance, based on a recording of a speech containing "play music," the voice recognition module may be configured to identify a speaker in the audio data as a particular user of a service. Additionally or alternatively, the voice recognition module may be configured to recognize that the phrase "play music" means that the user is requesting music to be streamed. In various embodiments, the voice recognition module may employ any suitable voice or speech recognition techniques such as acoustic modeling, language modeling, and natural language processing methods.

Additionally or alternatively, the service provider computer 300 can include a module for recognizing non-audio user commands such as a facial recognition module, a gesture recognition module, and the like. In some embodiments, command recognition module 302 is optional and some or all of the command recognition functionalities may be performed by a device such as an interactive device discussed in FIGS. 1 and 2. For example, the interactive device may be configured to identify the speaker whereas the voice recognition module of the service provider may be configured to determining the meaning of the speech using speech recognition techniques.

The contextual data processing module 304 can be configured to process contextual data including ambient data and other sensor data indicative of an environment associated with a request or a command. The contextual data and the results of processing the contextual data (e.g., extracted feature data) may be stored in the contextual data store 312. For instance, the contextual data processing module 304 may be configured to process and analyze an ambient sound using sound signal processing techniques to identify or extract one or more audio features such as temporal features (e.g., attack-time, temporal increase/decrease, effective duration, auto-correlation, coefficients, zero-crossing rate), energy features (e.g., global energy, harmonic energy, noise energy, modulation), spectral shape features (e.g., spread, centroid, skewness, variation), harmonic features, perceptual features (e.g., loudness, sharpness, spread), and the like. Sound features can also include sound pressure, sound pressure level, intensity, energy, energy density, exposure, audio frequency, and the like.

In some embodiments, the contextual data processing module 304 may be configured to process other types of non-audio contextual data. For instance, the contextual data processing module 304 may process image data (e.g., from still images or videos) using any suitable image processing techniques to extract features, detect objects, and the like. In some embodiments, different types of contextual data and/or contextual data obtained from different sources can be combined and processed to generate a set of extracted contextual data that represents a more accurate or consistent representation of the environment from which the contextual data is obtained. Any data fusion or sensor fusion techniques may be used including Central Limit Theorem, Kalman filter, Bayesian networks, Dempster-Shafter, and the like.

The context determination module 306 can be configured to determine a context of the request or command based on the contextual data. In particular, the contextual data, either directly or as processed by the contextual data processing module 304, may be compared with one or more known contextual profiles to determine if there is a match. The known can correspond to a predefined or previously identified context. Thus, a match between the contextual data and a particular contextual profile may indicate that the contextual data may correspond to the context associated with the contextual profile. For example, if features of an ambient sound match profile parameters corresponding to a baby's cry, the ambient sound may match the "crying baby" context associated with such profile parameters. Other contexts can include "dog barking," "car honking," and the like. Examples of more complex contexts can include "party," "restaurant," "mall" and the like.

A predetermined contextual profile can comprise a set of profile parameters, each corresponding to a particular feature or aspect extracted from the contextual data. The profile parameter can be associated with a profile parameter value or a range of profile parameter values. For instance, a profile parameter can be loudness or volume of an ambient sound and the parameter value can include a value or a range of values representing the loudness. Matching contextual data with a contextual profile can include matching features of the contextual data with corresponding profile parameters. Matching extracted features with profile parameters can include matching feature values of the features with the profile parameter values. In some embodiments, if a feature value is equal to the corresponding profile parameter value or falls within the range of the profile parameter value range, then there is a match. In some cases, there is a match between contextual data and a given profile when at least a predetermined number of features from the contextual data match the corresponding profile parameters of the profile.

As an example, a "party" profile may be associated with a "party" context. The "party" profile may include a plurality of profile parameters including a sound pressure level (measured in decibels) and an audio frequency range (measured in Hz). The parameter value range for the sound pressure level may be above 80. The parameter value range for the audio frequency range may be 1000-15000 Hz. An ambient sound with a sound pressure level of 85 and an audio frequency range of 1100-14000 may be determined to match the "party" profile, because the features match the corresponding profile parameters. In contrast, an ambient sound with a sound pressure level of 50 and an audio frequency range of 512-900 may be determined to not match the "party" profile.

In some embodiment, a probabilistic approach may be used in matching contextual data and the profile data. A confidence level or weight value indicating likelihood or confidence of a match may be determined for some or all of the profile parameters or contextual features. An overall confidence level associated with the profile may then be determined based on the feature-level confidence levels. A match may be found if the overall profile-level confidence level is above a certain predetermined threshold.

In some embodiments, the profile parameters can include those related to ambient sound such as discussed above (e.g., loudness, energy, temporal shape). In some other embodiments, the profile parameters can include features of non-audio contextual data such as time (e.g., time of day, day of week, week, month, year, seasonality), location information (e.g., latitude, longitude), movement features (e.g., speed, acceleration), visual features (e.g., light, brightness), proximity features (e.g., distance to users, objects, or other devices), temperature data, and the like. Depending on the types of features included in the contextual data, one or more contextual profiles may be selected and compared with some or all of the features of the contextual data. One or more of the profiles may match the contextual data. In some cases, the profiles are ranked according to their confidence levels indicating likelihood of a match and the top N highest ranking profiles are selected as matching, where N is a positive integer. In some embodiments, when two profiles conflict with each other (e.g., an "airport" profile and "birthday party" profile), one of the conflicting profiles may be removed from consideration based on disambiguation or conflict resolution rules and/or disambiguation factors (e.g., non-audio contextual data, interactive device data, user preferences).

The contextual profile data (including profiles and their associated contexts) and the results of the comparison may be stored in the profile data store 314. The contextual profile data may be created by system administrators, users, or generated based on previously processed contextual data. For example, when there is no match for a given set of contextual data, a new profile may be created comprising features extracted from the contextual data. In some cases, new profiles can be created by modifying and/or combining existing profiles.

The recommendation generation module 308 can be configured to generate recommendations based on context(s) determined above by the context determination module 306. A context may be associated with a set of recommendations suitable for the context. For instance, a list of party songs may be associated with a "party" context. A list of lullabies may be associated with a "crying baby" context. Generating recommendations can include retrieving existing recommendations, if any, associated with the determined context or determining new recommendations based on various factors. The association between contexts and recommendations may be predetermined by system administrators and/or users. The association may also be generated by an automated or semi-automated process based on machine learning algorithms. The data representing associations between contexts and recommendations may be stored in the recommendation data store 316. The content data (e.g., media content such as music or video files with or without associated metadata) from which recommendations are made may be stored in the content data store 318.

In some embodiments, the recommendations can also be generated based on information about the user. Such information can include personal information (e.g., age, gender, race, location, occupation, education, language, etc.), user preferences (e.g., favorite types of music or artists, playlists, etc.), user behavioral data for a user account (e.g., history or pattern of browsing, streaming, or playback), and the like.

In some embodiments, the recommendations can also be generated based on information about the device (which may or may not be part of the contextual data). Such information can include history data associated with the device such as previous interactions with the user, requests/responses with the service provider, previous playlists, behavioral data of users of the device (e.g., playback or streaming habits tied to the specific device), and the like.

Rules and configurations governing aspects of the modules discussed above can be stored in the rules data store 320. For instance, rules and configuration data may specify the algorithms and/or techniques used by the various modules. The rules and configuration data may be used by the contextual data processing module 304 to determine the different sets of features to extract for different types of contextual data. The rules and configuration data may also be used by the context determination module 306 to determine whether there is a match between features of contextual data and a contextual profile. The rules and configuration data may also be used by the recommendation generation module 308 to determine factors used to generate the recommendations, minimum and/or maximum number of recommendations to provide, data sources for obtaining recommended content, and the like.

Figure 4:
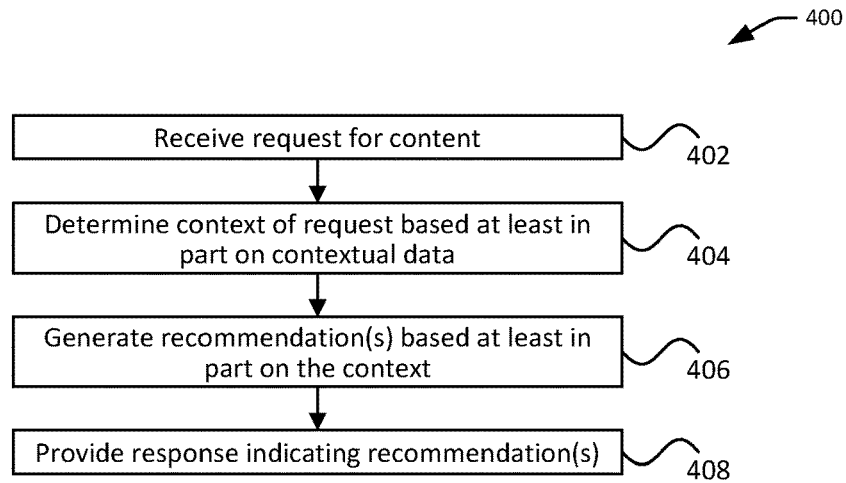
FIG. 4 illustrates an example process for implementing context-based recommendations, in accordance with embodiments.

FIG. 4 illustrates an example process 400 for implementing context-based recommendations, in accordance with embodiments. Aspects of the process 400 may be performed, in accordance with some embodiments, by one or more service provider computers such as discussed in connection with FIGS. 1 and 3, or by an interactive device such as discussed in connection with FIGS. 1 and 2. Some or all aspects of the process 400 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

The process 400 includes receiving 402 a request for content. The request may be received from an interactive device such as discussed in FIG. 2. The request may be for media content (e.g., music, video) or any other types of content (e.g., news, weather, etc.) to be streamed to and played-back by the interactive device. The request may be generated in response to a user input such as a voice command (e.g., "play music"), a gesture, or an indication via a keyboard, keypad, mouse, stylus, touchscreen, or other suitable means. The request may include both command data based on the user input (e.g., a voice command to stream music) and contextual data indicative of an environment or context surrounding the user, the interactive device, and/or the request.

The contextual data can include an ambient sound associated with the command data. For instance, the ambient sound may correspond to the background noise around the time a voice command occurred. The ambient sound may span a period of time immediately before, during, and/or immediately after the occurrence of voice command. Thus, the ambient sound is indicative of an environment when the request was generated and a context of the command.

The contextual data can also include time and/or location information. The time information (e.g., time of day, day of week, etc.) may indicate when the command data and/or contextual data is captured, when the request is generated or sent, or when a related event occurs. The location information can indicate a geographic location that the interactive device or the user is at or close to.

The contextual data can also include non-audio data captured by one or more sensors discussed herein. For example, the non-audio contextual data can include visual data (e.g., lighting information, images), temperature data, pressure data, chemical data, position information, motion data (e.g., speed, acceleration), proximity data, and the like. In some embodiments, the request also includes a device identifier or other information of the interactive device (e.g., operating system), user information (e.g., account identifier, user behavioral data), and the like that may be useful for generating customize recommendations. In some embodiments, the command data, the contextual data, and other related information may be provided in the same request or message, or in separate requests or messages.

In response to receiving the request, a context of the request or command is determined 404 based at least in part on the contextual data discussed above. The context may indicate a time, location, event, user activity, or a combination thereof. In some embodiments, data included in the request can be processed to isolate the command data (e.g., voice command) from the contextual data (e.g., ambient sound), for example, using filtering, transformation, or any other suitable signal processing techniques. In some embodiments, the command data and the contextual data may already be separated (e.g., a device that sends the request).

The command data can be processed to determine an identity of a user and/or intent of the user. The identity of the user may be used to determine a user account, user profile, user preferences, user history data, and other user related data. The intent of the user may be used to determine the type of service that the user wishes to receive (e.g., music streaming, traffic update), the type of media content (e.g., music, radio, podcast), the type (e.g., jazz, classical) or the artist of music, and other information related to the service that the user wishes to utilize. Where voice command is used, any suitable voice recognition or natural language processing techniques may be used to determine the identity and/or intent of the user. In some embodiments, an identity of the user or user account can be determined based on a device identifier identifying the interactive device used by the user.

In some embodiments, the identity and/or intent of the user can be used to guide or narrow the scope of the context determination and recommendation generation steps discussed below. For instance, certain profiles, contexts, and/or recommendations may be associated with specific users or groups of users. In some embodiments, only those profiles, contexts, recommendations, or other data associated with or relevant to a given user or user intent may be considered, thereby narrowing the scope of search for the suitable content for the user.

The contextual data can be processed to extract certain features. The extracted features may be compared with predetermined features (or profile parameters) included in one or more existing contextual profiles to determine whether there is match. If there is a match, the context associated with the matching profile may be obtained. Such profile-context association may also be defined by a system administrator, a user, or an automated or semi-automated process. In some cases, there may be multiple matching profiles, and hence multiple matching contexts. Where no matching profile is found, a new profile may be created using the features from the contextual data. If a profile is not associated with any context, a new or existing context may be selected to be associated with the profile, for example, based on the similarity of the profile with existing profiles. In an alternative embodiment, the association between profiles and contexts may be optional and the profiles may be associated directly with recommendations.

The context can also be further determined based on a time when a command (e.g., voice command) was received and/or a location of the interactive device. The time/location information may be combined with other contextual data, user information, device information, etc., to determine the context. For instance, if the time is on Thanksgiving Day and the location is at a user's home, then the context is likely "family gathering." As another example, if the time is Sunday afternoon, the location is US, and the ambient sound indicates a football game on TV, then the context is likely "football Sunday." On the other hand, if the time is Sunday afternoon but the location is Beijing, China, then it is unlikely that the context is "football Sunday." As yet another example, the same time of the year may have different meanings for different religions or cultures, so a user's religion or cultural background may be relevant in determining the context.

In some embodiments, a context can be determined based on non-audio data such as temperature information, motion information, visual data (e.g., lighting information), and the like. For instance, the rise of a temperature in a room may indicate a gathering of people in the room whereas the fall of the temperature may indicate less people are present in the room. Bright natural lighting may indicate a sunny day whereas dark or artificial lighting may indicate night time. The motion of the interactive device or an object near the interactive device may indicate that a user is engaged in certain types of activity (e.g., exercising, dancing, sleeping), and the corresponding content may be provided.

Based on the determined context or contexts, a list of one or more recommendations can be generated 406. For example, the recommendations may comprise a list of songs, music pieces, or other media content. Generating the list of recommendations may include accessing or retrieving existing list of items (e.g., based on an existing playlist), modifying an existing list, or creating a new list. In an example, multiple playlists may be combined, filtered, or otherwise processed to determine the recommended list. Existing recommendations may be associated with known contexts, for example, based on previous recommendations made in response to previous requests. Such recommendation-context association may also be defined by a system administrator, a user, or an automated or semi-automated process. In some embodiments, the recommendations may be generated further based on user data such as related to user preferences and/or device information such as the type of the interactive device used to play the recommended content.

In some embodiments, data mining, statistical analysis, and/or machine learning techniques may be used in the context determination and/or recommendation generation steps discussed above. For instance, these techniques can be used to analyze request and/or response data for a specific user account or a group of user accounts over a period of time to identify patterns or correlations among profiles, contexts, and recommendations. In some embodiments, such patterns or correlations may be further segmented by device types, user demographics, geographical regions, and the like. In some embodiments, feedback data such as user feedbacks with respect to the recommended content (e.g., data indicating like or dislike) can be obtained and used to train and improve the models used by such techniques.

A response indicating the recommendations can be provided 408 in a response that corresponds to the request. For example, the response may include information about the recommended content such as indication of resources (e.g., URIs) from which a list of recommended media content can be obtained. In some other examples, the response may include the recommended content data itself.

In some embodiment, new profiles and contexts may be created based on new contextual data. The correspondence between contextual data, contexts, profiles and corresponding recommendations can be stored (e.g., in the recommendations data store 316) so as to facilitate future generation of the recommendations. In an embodiment, an ambient profile can be generated comprising one or more features extracted from a first ambient sound received in a first request for media content. The ambient profile may be associated with an existing context or a newly created context. The ambient profile and/or the context can be associated with the recommended media content determined using techniques discussed herein. Data used or generated during the processing of the first request may be used for subsequent requests. For instance, a second request for media content may be received from a device that may or may not be the same as the device for the first request, the second request comprising a second ambient sound. If the second ambient sound matches the ambient profile generated based on the first ambient sound, then the previously-determined recommended media content associated with the first request may be provided in response to the second request. In some embodiments, matching of additional parameters may be required before providing the previously-determined recommended content to the second device, such as user accounts, device identifiers, and the like associated with the first and second requests.

In some embodiments, the context information discussed above can be used to determine whether to generate and/or provide recommendations at all. In some cases, content may be generated and/or provided with or without explicit user command. For example, media content may be streamed or not streamed depending on the context. In an example, when a temperature of a room (e.g., obtained from a thermostat operably connected to the interactive device) rises above a certain threshold value, a party context may be determined and corresponding party music for the determined context may be streamed automatically to the interactive device without being explicitly requested by the user. In another example, when the temperature of the room falls below a certain threshold value, the streaming of the party music may stop or a different type of music corresponding to a different context corresponding to the cooler temperature may be streamed automatically without being explicitly requested by the user. As another example, wakeup music may start streaming automatically when changes in lighting data (e.g., obtained from a light sensor) indicates morning time.

In some embodiments, the context information discussed above can be used to determine when to generate and/or provide recommendations. For instance, when the ambient sound indicates that a baby is crying in the background, soothing music may be played immediately after the detection of the ambient sound; whereas when lighting indicates that the sun has risen, wakeup music may be played after a certain predetermined delay from the time such lighting change is detected, e.g., to allow the user time to wake up by herself.

In some embodiments, the context information discussed above can be used to determine where to provide the recommendations. For instance, when a group context is detected from the contextual data, media content such as music or movies may be streamed to a nearby device that is meant for group consumption (e.g., TV, stereo system) with or without explicitly user command. In some cases, the device used to stream the content may or may not be the same as the device used to receive a user command.

Figure 5:
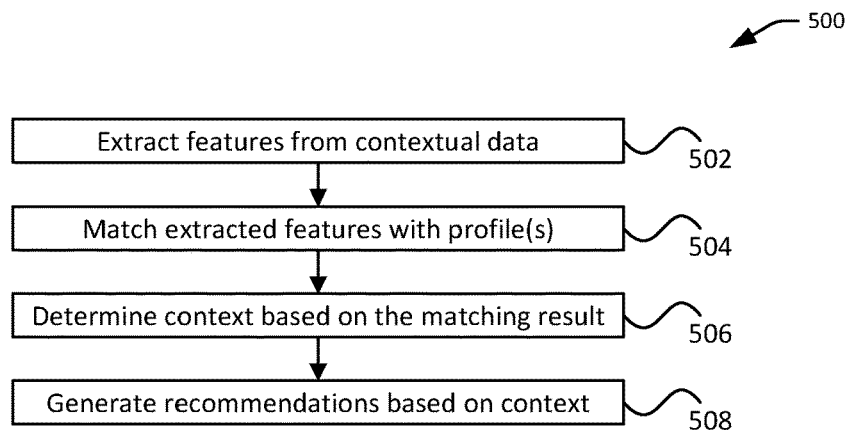
FIG. 5 illustrates another example process for implementing context-based recommendations, in accordance with embodiments.

FIG. 5 illustrates an example process 500 for implementing context-based recommendations, in accordance with embodiments. Aspects of the process 500 may be performed, in accordance with some embodiments, by one or more service provider computers such as discussed in connection with FIGS. 1 and 3 or by an interactive device such as discussed in connection with FIGS. 1 and 2.

The process 500 includes extracting 502 features from contextual data. As discussed above, the contextual data can include audio data such as ambient sound or non-audio data such as lighting, temperature, image data, proximity data, motion data, and the like. While the following discussion is provided using ambient sound as an example, it is understood that other non-audio contextual data can be processed using similar techniques for context determination and recommendation generation.

The ambient sound may be provided by an interactive device in a request for recommended media content to be played back by the interactive device. The ambient sound may include background noise associated with a voice command requesting media content. For instance, the ambient sound may be captured in an environment in which the voice command or around substantially same time when the voice command occurred. For example, the ambient sound can span a period of time before and/or after the occurrence of the voice command. The audio features extracted from the ambient sound can include temporal features (e.g., attack-time, temporal increase/decrease, duration, auto-correlation, coefficients, zero-crossing rate), energy features (e.g., global energy, harmonic energy, noise energy, modulation), spectral shape features (e.g., spread, centroid, skewness, variation), harmonic features, perceptual features (e.g., loudness, sharpness, spread), and the like. Audio features can also include sound pressure, sound pressure level, intensity, energy, energy density, exposure, audio frequency, and the like. Optionally, non-audio features can be extracted from other non-audio contextual data such as image data (e.g., from still images or videos).

The extracted features from the ambient sound (and optionally other non-audio features) can be matched 504 with one or more profiles associated with known contexts. In some embodiments, the profiles to be compared with the set of features can be selected based at least in part on the set of extracted features (e.g., audio, non-audio, or a combination thereof) to be compared. For example, if the set of features includes A, B, and C. Then, the selected profiles should include at least one of A, B, and C as their profile parameters. For example, Profile 1 may include A as its profile parameters. Profile 2 may include B and C as its profile parameters. Profile 3 may include A, B, and C. In some embodiments, the profile with the most number of parameters corresponding to the set of features (e.g., Profile 3) may be selected for the comparison. In other embodiments, profiles with at least certain number of corresponding parameters are selected for the comparison. For example, Profiles 2 and 3 may all be selected for having at least two corresponding parameters with the set of extracted features.

Matching contextual data with a contextual profile can include matching features of the contextual data with corresponding profile parameters. Matching extracted features with profile parameters can include matching feature values of the features with the profile parameter values of the profile parameters. In some embodiments, if a feature value is equal to the corresponding profile parameter value or falls within the range of the profile parameter value range, then there is a match. In some cases, there is a match between contextual data and a given profile when at least a predetermined number of features from the contextual data match the corresponding profile parameters of the profile.

In some embodiment, a probabilistic approach may be used in matching contextual data and the profile data. A confidence level or weight value indicating confidence or likelihood of a match may be determined for some or all of the profile parameters or contextual features. An overall confidence level associated with the profile may then be determined based on the parameter-level confidence levels. A match may be found if the overall profile-level confidence level is above a certain predetermined threshold.

A context can be determined 506 based on the matching result. For instance, one or more contexts associated with matching profile(s) can be retrieved and combined. In some embodiments, a confidence level of a profile and/or context can be determined based on other contextual data such as time information, location information, device information, visual data, temperature data, motion data, and the like. For example, certain types of contextual data may be determined to be more reliable or accurate and hence given more weight than other types of contextual data. For example, location and timing information may be deemed more reliable than ambient sound. Hence, a context determined based on the location and/or time information may be given a higher confidence level than a context determined based solely on the ambient sound. In some cases, a context determined based on a larger set of contextual data may be deemed more reliable than a context determined based on a fewer set of contextual data and hence given a higher confidence level. Contexts with confidence level above a certain predetermined threshold may be selected and combined. Conflicts among contexts may be resolved using predefined rules, contextual data, or any other suitable means. In some embodiments, new profiles may be created from the extracted features and associated with the determined context(s), so as to be useful for future profile matching.

In some embodiments, recommendations can be generated based on the determined context or contexts. Generating recommendations can include retrieving the recommendations associated with the determined context or creating new recommendations. The association between contexts and recommendations may be predetermined by system administrators and/or users. The association may also be generated by an automated or semi-automated process based on data mining or machine learning algorithms.

In some embodiments, the recommendations can also be generated based on information about the user. Such information can include user profile information (e.g., age, occupation, race, ethnicity, language), user preferences (e.g., favorite types of music or artists, preference indicators such as "like" or "dislike" provided by the user), patterns of user behavior with respect to certain content (e.g., repeated or frequent streaming or playback of a particular song or songs by a particular artist, skipping of certain songs), and the like. For example, behavioral data may indicate that Alice likes to play classical music from 10-11 pm in the evening while Brian likes play rock music during that time period. Such different behavioral data may be used to generate different recommendations for Alice and Brian, respectively.

In some embodiments, the recommendations can also be generated based on information specific to a particular interactive device. Such information can include history data associated with the device such as previous interactions with one or more users of the device, requests initiated by the device and/or responses received by the device from service providers, previous or current playlists, behavioral data of users of the device (e.g., playback or streaming habits, time and location information associated with the use of the device), and the like. For example, if a device has been used recently (e.g., within the last two weeks) to play a lot of songs by a certain artist, songs by this artist may be given more weight when selecting songs to recommend to be played on this device.

Figure 6:
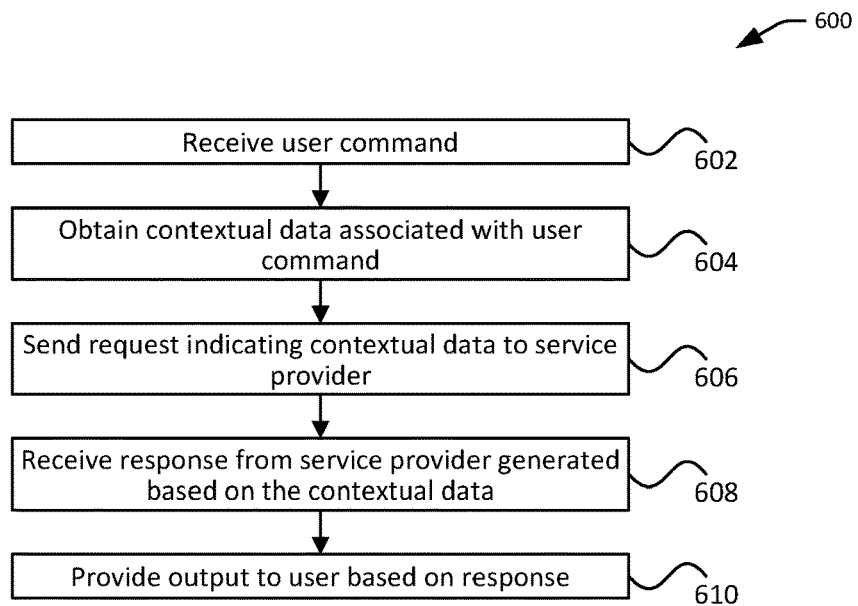
FIG. 6 illustrates yet another example process for implementing context-based recommendations, in accordance with embodiments.

FIG. 6 illustrates an example process 600 for implementing context-based recommendations, in accordance with embodiments. Aspects of the process 600 may be performed, in accordance with some embodiments, by an interactive device such as discussed in connection with FIGS. 1 and 2.

The process 600 includes receiving 602 a user command. The user command may be provided by a user using voice, gesture, touchscreen, or any other suitable methods. An example of a voice command may be "play music," or "tell me what the weather forecast is," or "what is the traffic like from home to work?" In some embodiments, the process 600 may include constant or periodic monitoring of sound in the surrounding environment. Certain predetermined keywords or phrases may trigger "active listening" of voice command. For example, utterance of a nickname for the interactive device may signal that the user is about to issue a voice command and in response, the interactive device may enter into an "active listening" mode for detecting and capturing the user's voice command. Any suitable voice recognition technique may be used to capture the voice command.

Contextual data associated with the voice command can be obtained 604. The contextual data can be spatially, temporally, or otherwise related to the voice command. For example, the contextual data can be obtained in the same geographic location as the voice command and/or around the same time the voice command was generated. The contextual data can be captured in any suitable manner. For example, different sensors may be activate or inactive at different times and/or in response to different triggering events. The ambient sound may span a predetermined period of time before, during, and/or after the occurrence of the voice command. Contextual data can also include non-audio data such as images data, time and location information, and the like. The capturing of contextual data may be indiscriminate or selective. For example, in a former case, any ambient sound for a certain period of time is captured. In the latter case, only certain ambient sound with one or more predetermined characteristics is captured.

Based on the user command, a request to a service provider may be generated 606. The request can indicate the contextual data associated with the request. For instance, the request can include the actual contextual data or reference to the actual contextual data. The request may be generated based on the user command alone, based on contextual data alone (without an explicit user command), or based on a combination of the user command and the contextual data. The service provider may be configured to generate recommendations based on a context of the request or command. For instance, the service provider may provide context-based music streaming service based on ambient noise and/or other contextual data. Varying degrees of data processing can be performed locally by the interactive device before sending the request and by a service provider that receives the request. For instance, in some embodiments, the interactive device may be configured to identify the speaker of the voice command and also determine the meaning of the voice command using any suitable voice recognition, machine listening, and/or natural language processing techniques. Different voice commands (e.g., "play music", "play radio", "what is the weather like?" etc.) may lead to requests to different service providers, for different services (e.g., streaming music, streaming radio, getting weather update, etc.), and/or for different user accounts. In such embodiments, the request may not include the actual user input (e.g., voice command) itself. In some other embodiments, only limited data processing (e.g., filtering out background noise of a voice command) is performed on the voice command and rest may be performed by the service provider. In such embodiments, the request may include the processed command data. In yet some other embodiments, the command data may not be locally processed at all, but is merely provided in the request to the service provider.

The request can include the contextual data or information about the contextual data to facilitate context-based decision-making by the service provider. Information about the contextual data can include indication of a location at which the contextual data is stored. Varying degrees of data processing may be performed by the interactive device and/or the service provider. In some cases, contextual data may be provided as is to the service provider. In some other cases, the contextual data may be processed by the interactive device before being provided to the service provider. For instance, the interactive device may perform some processing on the contextual data (e.g., ambient sound) to filter out signals deemed to be irrelevant and/or extract features that are deemed relevant. For example, if there is a baby's cry in the middle of a recording of a relatively long and quiet period, then only the small segment including the baby's cry may be included in the request as the contextual data instead of the entire recording.

The request can also include information about the device from which the request is sent such as a device identifier, a user account associated with the device, software and/or hardware configuration of the device, and the like. Information about a user or user account associated with the request may also be send as part of the request such as account identifier, user credentials, and the like.

Subsequently, a response is received 608 from the service provider. The response may be generated based at least in part on information included in the request. For instance, the response may be generated based on the contextual data included or indicated by the request. The response may include information for obtaining data or information requested by the request. For example, the response may include information for obtaining media content recommended by the service provider. The media content may include a list of media items (e.g., songs, videos) that can be streamed to a local device such as the interactive device that sends the request. In some cases, additional requests (to the same or different service providers) may be required in order to obtain the data or information to be provided to the user based on the response data. In some other cases, additional requests may not be required and the response may include the information to be provided to the user.

Based on the response, an output can be provided 610 to the user. For instance, where the response is from a music streaming service, the output can include music streaming or playback via a speaker. Additionally or alternatively, the output can be provided via a display device, a tactile device, or any other suitable output device discussed herein.

In some embodiments, additional customization may be applied before or when the content is provided to the user. Such customization may be performed by a streaming or playback device. The customization may be based on the current contextual information surrounding the device, or hardware or software configurations of the device (e.g., device type or operating system). For instance, the volume of music being streamed may be set high in a party environment. As another example, the resolution or other aspects of a video may be set according to the screen resolution of a display device.

Figure 7:
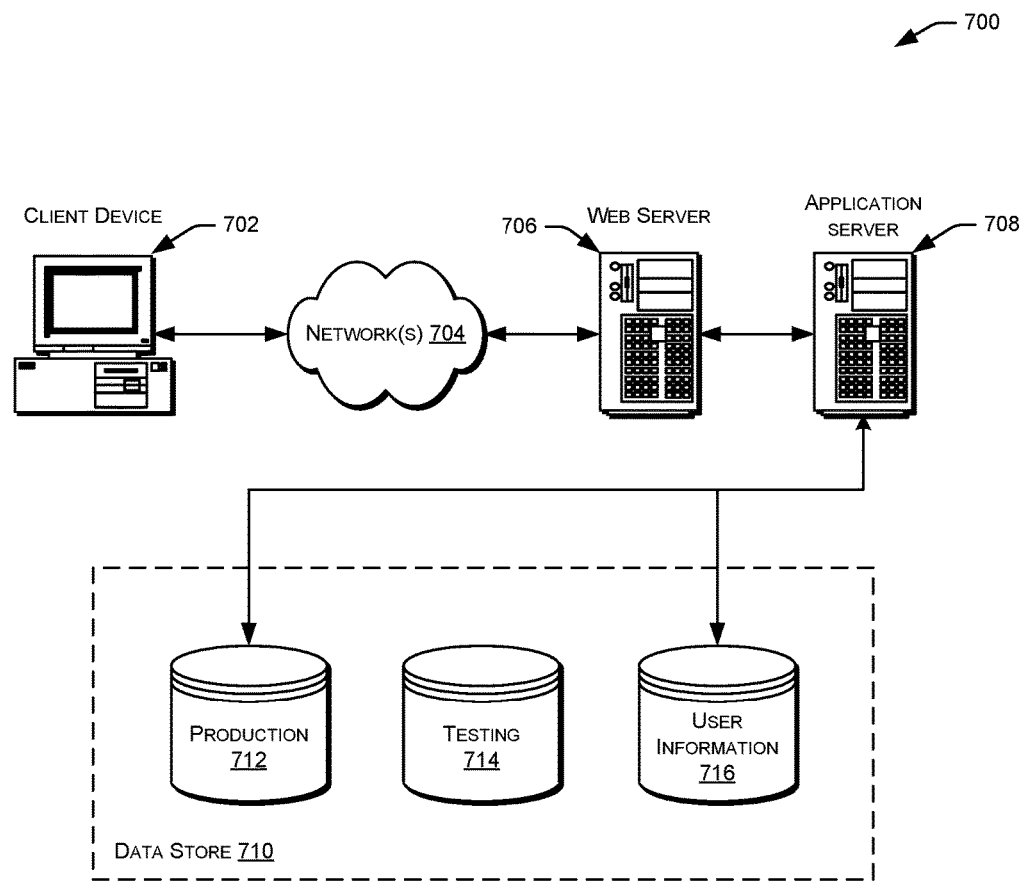
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    storing, at a service provider computing system, profile information for a user that includes at least user preferences, the user preferences indicating preferred types of media content to be played with respect to particular activities;
    receiving, from a voice-activated device, a voice command requesting media content to be played by the voice-activated device;
    receiving an ambient sound captured by the voice-activated device, the ambient sound being associated with the voice command;
    determining, based on the voice command, the user from which the voice command was received;
    determining a context of the voice command based at least in part on the ambient sound, the context indicating an activity in which the user is engaged;
    determining, by accessing the profile information for the user, recommended media content based at least in part on the determined context and based on the user preferences with respect to the determined activity; and
    providing the recommended media content to the voice-activated device to be presented by the voice-activated device.

2. The computer-implemented method of claim 1, wherein determining the context is further based on a time when the voice command is received or a location of the voice-activated device.

3. The computer-implemented method of claim 1, wherein the context is indicative of a time, a location, or an event.

4. The computer-implemented method of claim 1, wherein determining the context of the voice command comprises:
    processing the ambient sound to extract an audio feature;
    comparing the extracted audio feature with predetermined audio features associated with known contexts; and
    determining the context from the known contexts based at least in part on the comparison.

5. A computer-implemented method, comprising:
    storing profile information for a user that includes at least user preferences indicating at least one preferred type of media content to be played with respect to at least one respective activity;
    receiving a request for media content from a device;
    determining, based on the request, the user from which the request was received;
    determining a context of the request based at least in part on contextual data indicative of an environment of the device when the request was generated, the context indicating an activity in which the user is engaged;
    generating, by accessing the profile information for the user, recommended media content based at least in part on the determined context and based on the user preferences with respect to the determined activity; and
    providing the recommended media content to the device to be played by the device.

6. The computer-implemented method of claim 5, wherein the request is generated in response to a voice command.

7. The computer-implemented method of claim 5, wherein the contextual data includes an ambient sound.

8. The computer-implemented method of claim 5, wherein determining the context of the request or command comprises:
    processing the contextual data to extract a feature;
    comparing the extracted feature of the contextual data with predetermined features associated with known contexts; and
    determining the context from the known contexts based at least in part on the comparison.

9. The computer-implemented method of claim 5, wherein the contextual data includes non-audio data.

10. The computer-implemented method of claim 9, wherein the non-audio data is indicative of a time or a location of the device.

11. The computer-implemented method of claim 5, further comprising:
    generating a profile associated with the context and the user, the profile comprising one or more features extracted from the contextual data; and
    associating the context with the recommended media content and the user.

12. The computer-implemented method of claim 11, further comprising:
    receiving a second request for media content from the user via the device, the second request comprising second contextual data;
    determining that the second contextual data matches the profile; and
    providing the recommended media content associated with the context to the device in response to the second request.

13. A computer system, comprising:
    a memory that stores computer-executable instructions; and
    a processor configured to access the memory and execute the computer-executable instructions to implement a method comprising:
        storing profile information that includes at least user preferences, the user preferences indicating preferred types of media content to be played with respect to particular activities for each of a plurality of users;

receiving a request for media content from a device;

determining, based on the request, a user of the plurality of users from which the request was received;

determining a context of the request based at least in part on contextual data indicative of an environment of the device when the request was generated and an activity in which the user is engaged;

generating, by accessing the profile information for the user, recommended media content based at least in part on an ambient sound indicative of an environment of the device and based on preferences of the user with respect to the activity; and providing the recommended media content to the device to be played by the device.

14. The computer system of claim 13, wherein the request comprises a voice command.

15. The computer system of claim 13, wherein the contextual data includes at least one of ambient sound, lighting data, or temperature data.

16. The computer system of claim 15, wherein determining the context of the request comprises:

processing the contextual data to extract a feature;

comparing the extracted feature of the contextual data with predetermined features associated with known contexts; and determining the context from the known contexts based at least in part on the comparison.

17. The computer system of claim 13, wherein the contextual data is indicative of one or more people near the device.

18. The computer system of claim 13, wherein the contextual data is captured by the device.

19. The computer system of claim 13, wherein the method further comprising:

generating a profile associated with the context and the user, the profile comprising one or more features extracted from the contextual data; and associating the profile with the recommended media content and the user.

20. The computer system of claim 19, wherein the method further comprising:

receiving a second request for media content from the user via the device, the second request comprising second contextual data;

determining that the second contextual data matches the profile; and providing the recommended media content associated with the context to the device in response to the second request.

* * * * *